US009649894B2

(12) United States Patent
Keller et al.

(10) Patent No.: US 9,649,894 B2
(45) Date of Patent: May 16, 2017

(54) TIRE PRESSURE SENSOR ASSEMBLIES INCLUDING A TIRE PRESSURE SENSOR FOR MATING WITH AN OVER-INFLATION PRESSURE RELIEF VALVE IN AN AIRCRAFT WHEEL SYSTEM

(71) Applicant: Goodrich Corporation, Charlotte, NC (US)

(72) Inventors: Steven T. Keller, Union, OH (US); Paul L. Summers, Troy, OH (US); Scott Whittle, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/789,721

(22) Filed: Jul. 1, 2015

(65) Prior Publication Data
US 2017/0001484 A1 Jan. 5, 2017

(51) Int. Cl.
*B60C 23/04* (2006.01)
*B60C 29/06* (2006.01)
*F16K 15/20* (2006.01)
*F16K 17/16* (2006.01)

(52) U.S. Cl.
CPC .......... *B60C 23/04* (2013.01); *B60C 23/0496* (2013.01); *B60C 23/0498* (2013.01); *B60C 29/068* (2013.04); *F16K 15/207* (2013.01); *B60C 23/0484* (2013.01); *B60C 23/0494* (2013.01); *F16K 17/16* (2013.01)

(58) Field of Classification Search
CPC ... B60C 23/0494; B60C 29/068; F16K 17/16; F16K 17/403

USPC ......... 137/68.23, 68.25, 224, 227, 228, 230, 137/231; 152/427
See application file for complete search history.

(56) References Cited

U.S. PATENT DOCUMENTS

| 1,261,018 | A | * | 4/1918 | Gebhardt | ................ B60S 5/043 137/224 |
| 3,693,691 | A | * | 9/1972 | Summers | ................ B60C 29/06 137/68.26 |
| 4,064,923 | A | | 12/1977 | German et al. | |

(Continued)

FOREIGN PATENT DOCUMENTS

| FR | 2551556 | 3/1985 |
| JP | H02229972 | 9/1990 |

OTHER PUBLICATIONS

Extended European Search Report dated Apr. 15, 2016 in European Application No. 15199479.5.

(Continued)

*Primary Examiner* — Mary McManmon
*Assistant Examiner* — Richard K Durden
(74) *Attorney, Agent, or Firm* — Snell & Wilmer L.L.P.

(57) ABSTRACT

A tire pressure sensor is provided. The tire pressure sensor comprises a sensor housing having a first engagement portion defining an opening. A pressure sensing element is within the sensor housing and is in fluid communication with the opening of the sensor housing. The tire pressure sensor is configured to engage and be in fluid communication with an over-inflation pressure relief valve. The over-inflation relief valve is engagable in a wheel of an aircraft wheel assembly. The tire pressure sensor is also disengageable from the over-inflation pressure relief valve. A tire pressure sensor assembly and an aircraft wheel system are also provided.

17 Claims, 5 Drawing Sheets

(56) References Cited

U.S. PATENT DOCUMENTS

| | | | |
|---|---|---|---|
| 4,248,080 A | | 2/1981 | Chuck |
| 4,365,643 A | | 12/1982 | Masclet |
| 4,517,834 A | | 5/1985 | Luke |
| 5,181,977 A | | 1/1993 | Gneiding et al. |
| 5,335,541 A | * | 8/1994 | Sharpe .................... B60C 23/02 |
| | | | 340/445 |
| 5,365,967 A | | 11/1994 | Moore |
| 7,509,849 B2 | * | 3/2009 | Rutherford ......... B60C 23/0408 |
| | | | 340/447 |
| 2008/0314488 A1 | | 12/2008 | Achterholt |
| 2013/0269849 A1 | * | 10/2013 | Hennig ................ B60C 23/003 |
| | | | 152/427 |
| 2016/0169762 A1 | | 6/2016 | Summers |

OTHER PUBLICATIONS

U.S. Appl. No. 14/570,890, filed Dec. 15, 2014.
Preinterview First Office Action dated Jul. 29, 2016 in U.S. Appl. No. 14/570,890.
First Action Interview Office Action dated Sep. 19, 2016 in U.S. Appl. No. 14/570,890.
Extended European Search Report dated Nov. 2, 2016 in European Application No. 16177563.0.
Final Office Action dated Mar. 24, 2017 in U.S. Appl. No. 14/570,890.

* cited by examiner

TIRE PRESSURE SENSOR ASSEMBLIES INCLUDING A TIRE PRESSURE SENSOR FOR MATING WITH AN OVER-INFLATION PRESSURE RELIEF VALVE IN AN AIRCRAFT WHEEL SYSTEM

FIELD

The present disclosure relates generally to tire pressure sensors and, more specifically, to tire pressure sensor assemblies including a tire pressure sensor for mating with an over-inflation pressure relief valve in an aircraft wheel system.

BACKGROUND

Conventional aircraft wheel assemblies often include over-inflation pressure relief valves to prevent over-inflation of aircraft tires. Fewer aircraft wheel assemblies include tire pressure monitoring systems. Adding tire pressure monitoring systems to existing aircraft can be expensive and requires significant additional equipment and wiring. Further, in some aircraft, the additional equipment cannot be installed after initial assembly. While one-piece units comprising a combination tire pressure sensor and over-inflation (OI) pressure relief valve have been developed, a failure of either the tire pressure sensor segment or the OI pressure relief valve segment disadvantageously requires replacing the entire one-piece unit.

SUMMARY

A tire pressure sensor is provided in accordance with various embodiments. The tire pressure sensor comprises a sensor housing having a first engagement portion defining an opening. A pressure sensing element is within the sensor housing and is in fluid communication with the opening of the sensor housing. The tire pressure sensor is configured to engage and be in fluid communication with an over-inflation pressure relief valve. The over-inflation relief valve is engagable in a wheel of an aircraft wheel assembly. The tire pressure sensor is also disengageable from the over-inflation pressure relief valve.

A tire pressure sensor assembly is provided, according to various embodiments. The tire pressure sensor assembly comprises an over-inflation pressure relief valve a tire pressure sensor engaged with, and configured to be in fluid communication with, the over-inflation pressure relief valve and disengageable therefrom. The over-inflation pressure relief valve is engagable in a wheel of an aircraft wheel assembly. The tire pressure sensor comprises a sensor housing having a first engagement portion defining an opening and a pressure sensing element within the sensor housing and in fluid communication with the opening of the sensor housing.

An aircraft wheel system is provided in accordance with various embodiments. The aircraft wheel system comprises a wheel having a sensor receptacle. An over-inflation pressure relief valve within pressure relief housing has a stem configured to mate with the sensor receptacle and defines a tire inflation gas entry opening. The over-inflation pressure relief valve comprises a frangible disk configured to rupture at a predetermined pressure. A tire pressure sensor is engageable with and disengageable from the over-inflation pressure relief valve. The tire pressure sensor is in fluid communication with the over-inflation pressure relief valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Figure 1:
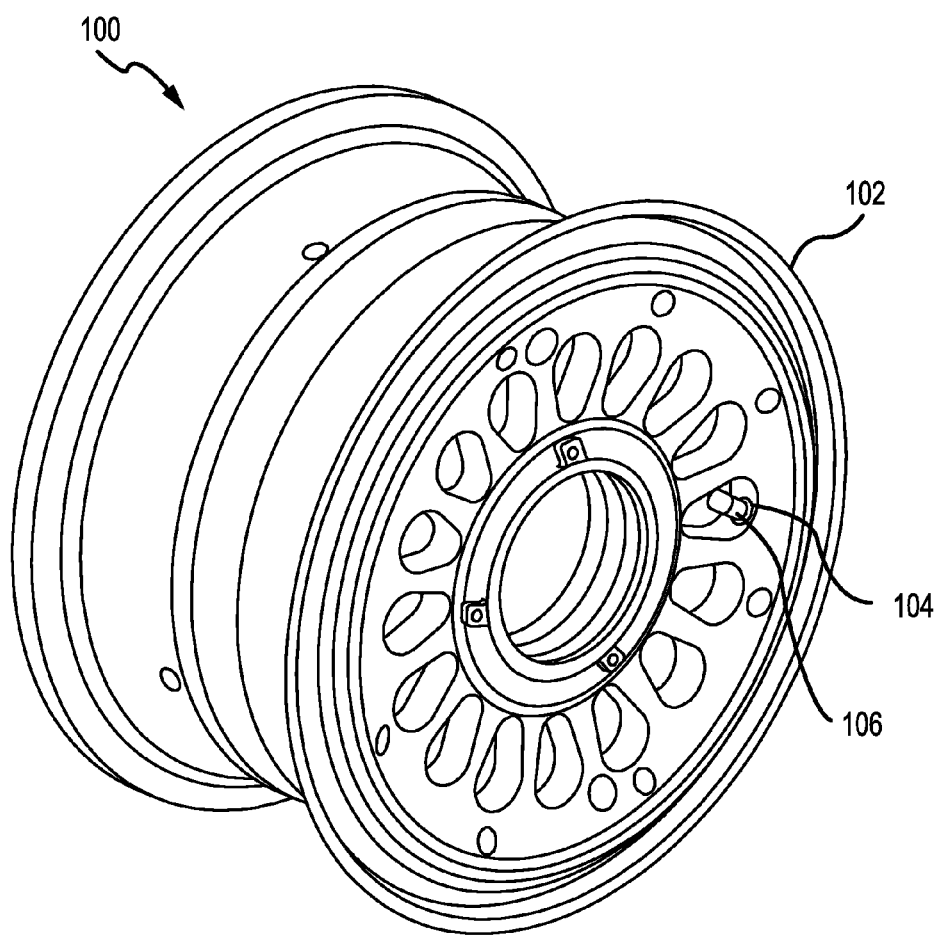
FIG. 1 illustrates a perspective view of an aircraft wheel in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes various embodiments of tire pressure sensor assemblies including a tire pressure sensor for mating with an over-inflation pressure relief valve for use with aircraft wheels, as well as aircraft wheel systems. Various embodiments may be utilized in new aircraft designs, or retrofit to existing aircraft. Various embodiments permit easy replacement of a failed tire pressure sensor or failed over-inflation (OI) pressure relief valve, without having to sacrifice a one-piece unit comprising a combination tire pressure sensor and over-inflation pressure relief valve.

With initial reference to FIG. 1, a wheel system 100 in accordance with various embodiments is illustrated. In various embodiments, wheel system 100 comprises a wheel 102 having a valve receptacle 104. Valve receptacle 104 may, for example, receive an over-inflation pressure relief valve 106. Valve receptacle 104 may have the same size, shape, and configuration as conventional valve receptacles of conventional aircraft wheel systems. For example, valve receptacle 104 may comprise a threaded portion configured to mate with a complementary threaded portion of a sensor and/or valve. However, any configuration of valve receptacle 104 is within the scope of the present disclosure.

Figure 2:
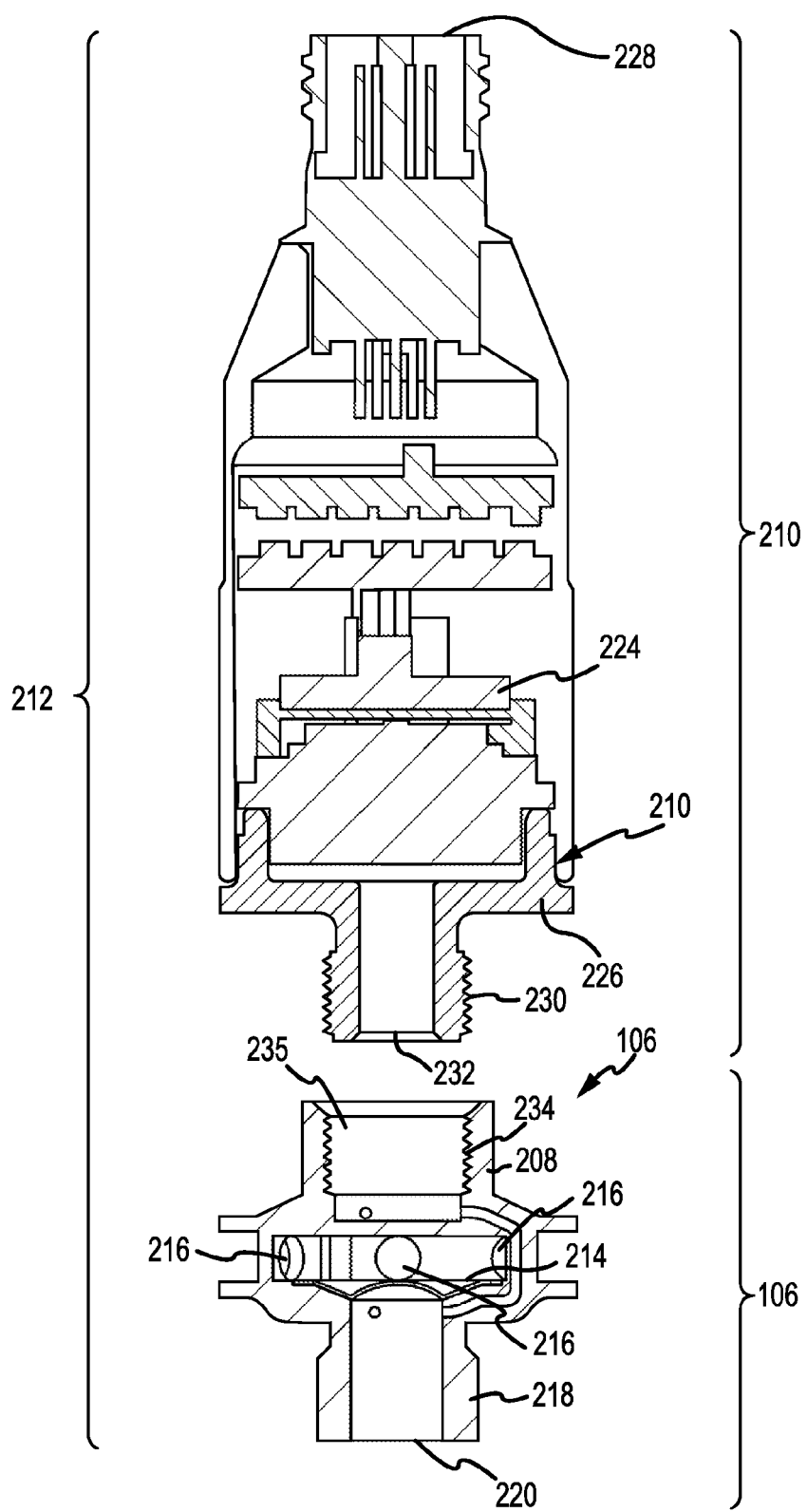
FIG. 2 illustrates an assembly view of the tire pressure sensor configured to be assembled with the over-inflation (OI) pressure relief valve forming a tire pressure sensor assembly in accordance with various embodiments.
Figure 3:
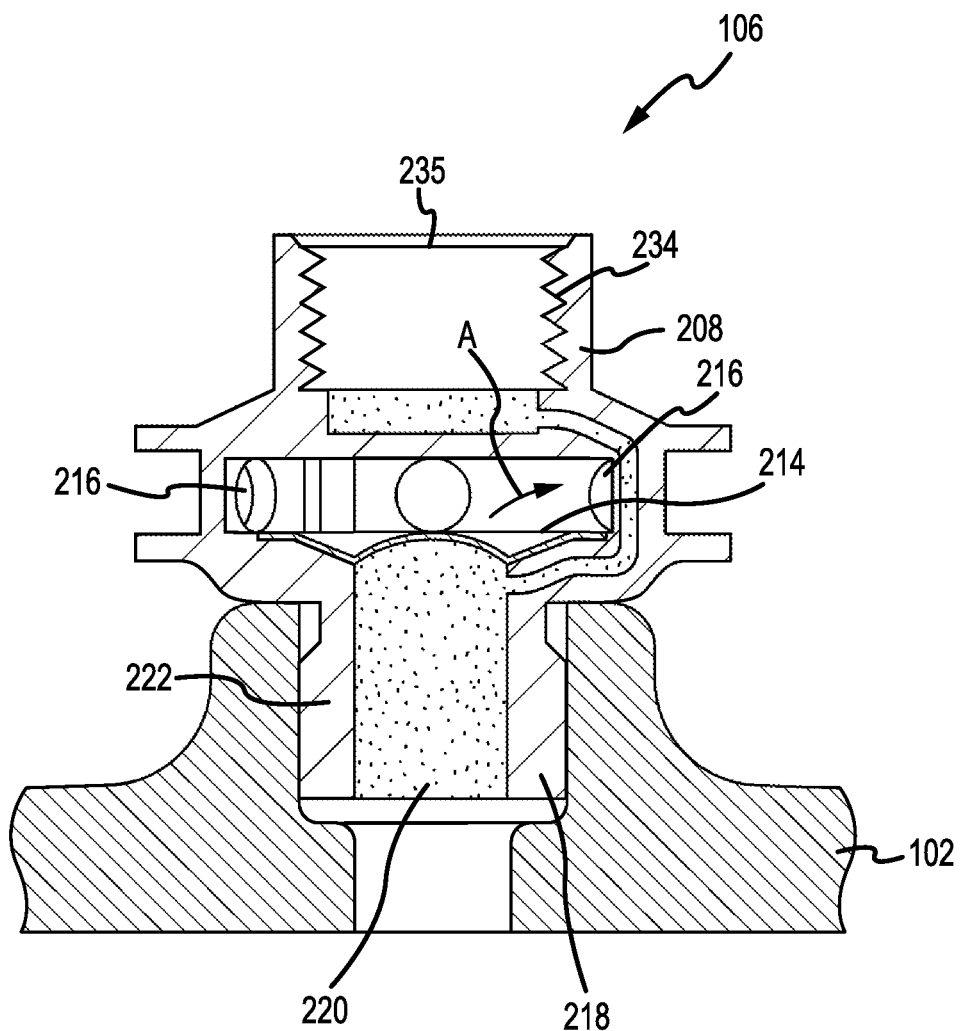
FIG. 3 illustrates a cross-sectional view of the over-inflation pressure relief valve of FIG. 2 in accordance with various embodiments, with stippling indicating the areas configured to be occupied by tire inflation gas.
Figure 4:
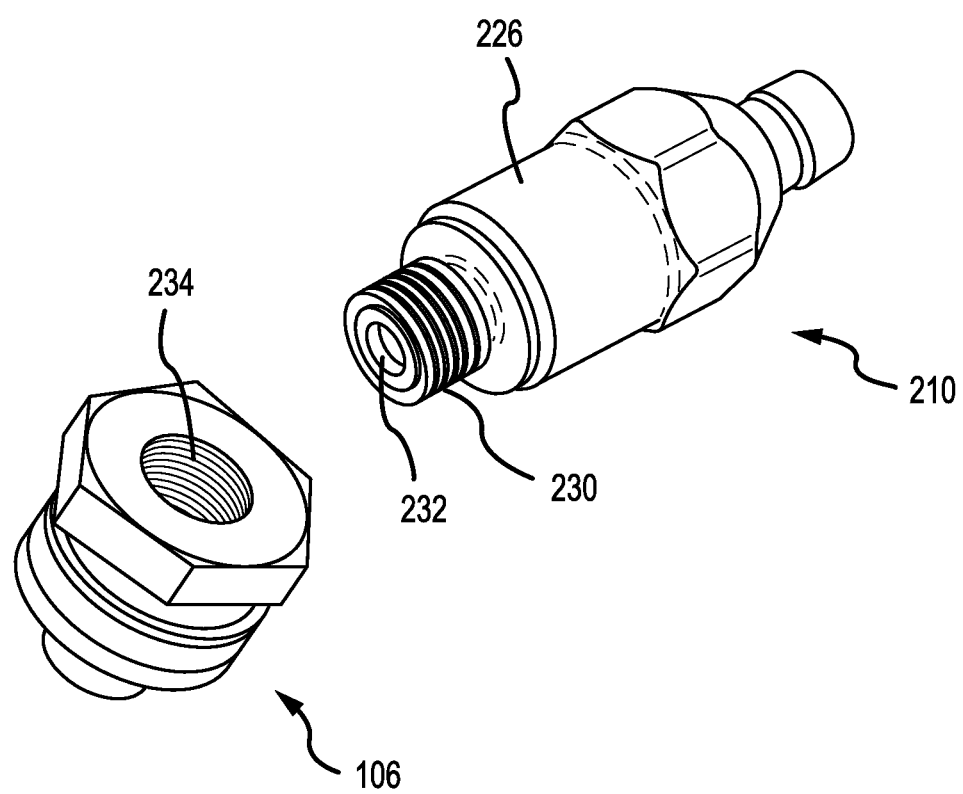
FIG. 4 illustrates a perspective view of each of the tire pressure sensor and the over-inflation pressure relief valve in accordance with various embodiments.

Referring now to FIGS. 2 through 4, a tire pressure sensor assembly 212 comprises an over-inflation pressure-relief valve 106 (FIG. 3) engaged with a tire pressure sensor 210. The tire pressure sensor 210 is configured to engage and be in fluid communication with the over-inflation pressure relief valve. The tire pressure sensor is also disengageable from the over-inflation pressure-relief valve 106. The over-inflation pressure relief valve 106 may comprise a pressure relief housing 208 in accordance with various embodiments. In various embodiments, pressure relief housing 208 comprises a metal, such as brass or steel. In further embodiments, pressure relief housing 208 comprises a composite material. In yet further embodiments, pressure relief housing 208 comprises a ceramic material. Although discussed with reference to specific embodiments, pressure relief housing 208 may comprise any suitable material.

Pressure relief housing 208 may be manufactured using additive manufacturing techniques, such as, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and/or digital light processing. Pressure relief housing 208 may also be manufactured using "conventional" techniques such as, for example, casting, machining, welding, or bonding. Any material and configuration of pressure relief housing 208 capable of withstanding pressure associated with inflated aircraft tires (e.g., 30 psi to 350 psi) is within the scope of the present disclosure.

Pressure relief housing 208 may comprise, for example, a stem 218. Stem 218 may be configured to interact with and be retained by valve receptacle 104 such that the over-inflation pressure relief valve is engageable in the wheel 102 of the aircraft wheel assembly (see FIG. 1). In various embodiments, stem 218 comprises a threaded portion 222. Threaded portion 222 may be complementary to a threaded portion of valve receptacle 104 of wheel 102 (see FIG. 1). Similar to valve receptacle 104, stem 218 may have the same size, shape, and configuration as that of a conventional over-inflation pressure valve stem so as to fit within and be retained by conventional aircraft wheel systems. However, any configuration of stem 218 is within the scope of the present disclosure. Stem 218 may be open to and in fluid communication with a tire coupled to wheel 102. For example, stem 218 may define a tire inflation gas entry opening 220. In various embodiments, tire inflation gas passes through tire inflation gas entry opening 220 and into pressure relief housing 208 (of over-inflation pressure relief valve 106). The over-inflation pressure relief valve 106 may comprise a second engagement portion 234 defining a tire inflation gas outlet opening 235 in fluid communication with the tire pressure sensor (the tire pressure sensor includes a first engagement portion 230 as hereinafter described).

Both of the first and second engagement portions may have complementary threaded portions enabling engagement and disengagement of the over-inflation pressure relief valve 106 with the tire pressure sensor 210 (more particularly, engagement and disengagement of the first and second engagement portions). While a threaded mating is illustrated, it is to be understood that other mechanical interfaces may be used to permit engagement and disengagement of the over-inflation pressure relief valve 106 with the tire pressure sensor 210. For example, a quick-connection type mechanism may be used. Lockwire, lock cable, thread locking compounds, or mechanical methods may be used for additionally securing the over-inflation pressure relief valve 106 with the tire pressure sensor 210 so as to substantially prevent unintentional separation of the tire pressure sensor from the over-inflation pressure relief valve. The tire pressure sensor and over-inflation pressure relief valve may be secured, for example, to the wheel. The ability of the tire pressure sensor to disengage from the over-inflation pressure relief valve enables replacement of a failed sensor or valve.

Over-inflation pressure relief valve 106 may further comprise a frangible disk 214. Frangible disk 214 may be configured to rupture upon reaching a predetermined pressure, allowing pressure to be released from a tire coupled to wheel 102. The arrow A in FIG. 3 indicates the path by which the pressure is released (through one or more apertures 216 in pressure relief housing 208). In various embodiments, the predetermined pressure at which frangible disk 214 ruptures is selected to be a pressure below that at which damage may occur to components of wheel system 100. For example, frangible disk 214 may be configured to rupture when a tire reaches an inflation pressure of between about 1400 kPa and 2000 kPa, and further, about 1700 kPa. Although described with reference to a particular predetermined pressure, frangible disk 214 may be configured to rupture at any predetermined pressure. With the frangible disk 214 intact (i.e., not ruptured), the tire pressure sensor 210 monitors the fluid pressure in the tire pressure sensor assembly 212. Over-inflation pressure relief valve 106 and tire pressure sensor 210 of tire pressure sensor assembly 212 may be in fluid communication with each other, such that the fluid pressure in the over-inflation pressure relief valve 106 is substantially the same as the fluid pressure in the tire pressure sensor 210.

Tire pressure sensor 210 within a sensor housing 226 may comprise, for example, a pressure sensing element 224. The sensor housing 226 has a first engagement portion 230 defining an opening 232. In various embodiments, pressure sensing element 224 is in fluid communication with tire inflation gas entry opening 220 of pressure relief housing 208 and opening 232, and is configured to sense the pressure of tire inflation gas within a tire coupled to wheel 102. The sensor housing 226 in accordance with various embodiments comprises a metal, such as brass or steel. In further embodiments, sensor housing comprises a composite material. In yet other embodiments, sensor housing comprises a ceramic material. Although discussed with reference to specific embodiments, sensor housing may comprise any suitable material.

Sensor housing may be manufactured using additive manufacturing techniques, such as, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and/or digital light processing. Sensor housing may also be manufactured using "conventional" techniques such as, for example, casting, machining, welding, or bonding. Any material and configuration of sensor housing capable of withstanding pressure associated with inflated aircraft tires is within the scope of the present disclosure.

In various embodiments, tire pressure sensor 210 may further comprise a connector 228. The connector 228 may comprise, for example, an electronic device coupled to pressure sensing element 224 and capable of communicating with and reporting pressure data to an external device. The connector may comprise a pinless connector.

Figure 5:
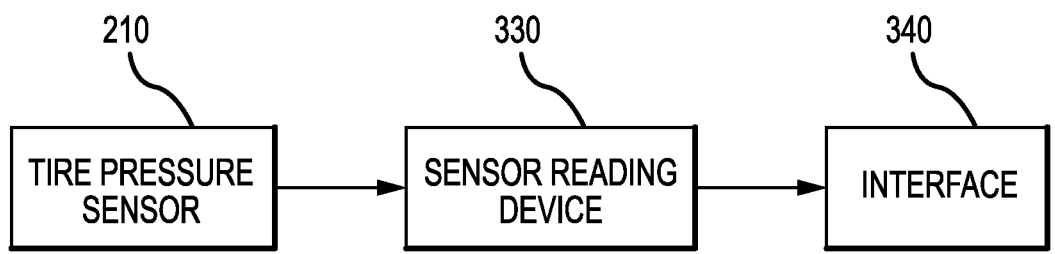
FIG. 5 illustrates a schematic diagram of a wheel system in accordance with various embodiments.

Referring now specifically to FIG. 5, tire pressure sensor 210 may communicate with a sensor reading device 330 to transmit pressure data. For example, connector 228 of tire pressure sensor 210 may comprise an electronic device configured to be powered and interrogated by an external magnetic field. In such configurations, sensor reading device 330 may provide an external magnetic field when activated in proximity to connector 228, powering and interrogating connector 228 to obtain pressure data from wheel 102. Sensor reading device 330 may comprise a handheld device such as, for example, a smart electronic wand. Such a sensor reading device 330 may allow an operator to check the pressures of one or more tires without physically coupling each tire pressure sensor 210 to an interface. However, any sensor reading device capable of communicating with tire pressure sensor 210 to obtain pressure data is within the scope of the present disclosure.

Sensor reading device 330 may be configured to transmit pressure data from tire pressure sensor 210 to an interface 340. For example, interface 340 may comprise a display. In various embodiments, interface 340 comprises a display which is integral with sensor reading device, such as a graphical user interface ("GUI") or display screen. In further embodiments, sensor reading device 330 is electronically coupled to an interface 340 such as, for example, a data logging computer. Any interface 340 capable of receiving and/or displaying pressure data from sensor reading device 330 is within the scope of the present disclosure.

Tire pressure sensor assemblies of the present disclosure may provide more cost effective and user-friendly relative to one-piece units comprising a combination tire pressure sensor and over-inflation pressure relief valve. For example, using discrete and separate tire pressure sensors and over-inflation pressure relief valves instead of the one-piece unit comprising the combination tire pressure sensor and over-inflation pressure relief valve saves costs when only one of the tire pressure sensor or the over-inflation pressure relief valve fails as the failed sensor or valve may be replaced without having to sacrifice the entire one-piece unit. The still operational sensor or valve may be reused in a tire pressure sensor assembly.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tire pressure sensor assembly comprising:
   a tire pressure sensor comprising:
      a sensor housing having a first engagement portion defining an opening; and
      a pressure sensing element within the sensor housing and in fluid communication with the opening of the sensor housing;
   wherein the tire pressure sensor is configured to engage and be in fluid communication with an over-inflation pressure relief valve engagable in a wheel of an aircraft wheel assembly, the tire pressure sensor also disengageable from the over-inflation pressure relief valve,
   wherein the tire pressure sensor is configured to sense a pressure of tire inflation gas, which exits a tire, during inflation of the tire,
   wherein the over-inflation pressure relief valve comprises a frangible disk configured to rupture at a predetermined pressure, and
   wherein the over-inflation pressure relief valve comprises a pressure relief housing comprising a stem defining a tire inflation gas entry opening and a second engagement portion defining a tire inflation gas outlet opening.

2. The tire pressure sensor assembly of claim 1, further comprising a connector for coupling the pressure sensing element to an electronic device capable of communicating with and reporting pressure data to an external device.

3. The tire pressure sensor assembly of claim 1, wherein the tire pressure sensor is powered and interrogated by an external magnetic field.

4. The tire pressure sensor assembly of claim 1, wherein the tire pressure sensor is configured to monitor pressure when the frangible disk is intact.

5. The tire pressure sensor assembly of claim 1, wherein the stem comprises a threaded portion configured to mate with a complementary threaded portion of a sensor receptacle in the wheel.

6. The tire pressure sensor assembly of claim 1, wherein the first engagement portion is configured to engage with and disengage from the second engagement portion.

7. The tire pressure sensor assembly of claim 6, wherein the first engagement portion is configured to be received in the tire inflation gas outlet opening and engaged with the second engagement portion of the pressure relief housing.

8. The tire pressure sensor assembly of claim 7, wherein the first engagement portion comprises a threaded portion and the second engagement portion comprises a complementary threaded portion.

9. A tire pressure sensor assembly comprising:
an over-inflation pressure relief valve engagable in a wheel of an aircraft wheel assembly, the over-inflation pressure relief valve defining a tire inflation gas entry opening and a tire inflation gas outlet opening, wherein a tire inflation gas, which exits a tire coupled to the wheel, enters the over-inflation pressure relief valve through the tire inflation gas entry opening; and
a tire pressure sensor engaged with, and configured to be in fluid communication with, the over-inflation pressure relief valve and disengageable therefrom, the tire pressure sensor comprising:
a sensor housing having a first engagement portion defining an opening, wherein the first engagement portion is configured to be received in the tire inflation gas outlet opening; and
a pressure sensing element within the sensor housing and in fluid communication with the opening of the sensor housing, wherein the tire pressure sensor is configured to sense a pressure of the tire inflation gas during inflation of the tire,
wherein the over-inflation pressure relief valve is within a pressure relief valve housing comprising a stem configured to mate with a sensor receptacle in the wheel of the aircraft wheel assembly and defining an opening, the over-inflation pressure relief valve comprising a frangible disk configured to rupture at a predetermined pressure and the tire pressure sensor configured to monitor pressure when the frangible disk is intact.

10. The tire pressure sensor assembly of claim 9, wherein the stem of the pressure relief housing defines the tire inflation gas entry opening and the pressure relief housing further comprises a second engagement portion defining the tire inflation gas outlet opening.

11. The tire pressure sensor assembly of claim 10, wherein the first engagement portion is configured to engage with and disengage from the second engagement portion.

12. The tire pressure sensor assembly of claim 11, wherein the first engagement portion comprises a threaded portion and the second engagement portion comprises a complementary threaded portion.

13. The tire pressure sensor assembly of claim 9, wherein the stem comprises a threaded pattern configured to mate with a complementary threaded pattern of the sensor receptacle in the wheel.

14. An aircraft wheel system, comprising:
a tire coupled to a wheel having a sensor receptacle;
an over-inflation pressure relief valve within a pressure relief housing having a stem configured to mate with the sensor receptacle and defining a tire inflation gas entry opening and a tire inflation gas outlet opening, wherein a tire inflation gas, which exits the tire, enters the over-inflation pressure relief valve through the tire inflation gas entry opening;
the over-inflation pressure relief valve comprising a frangible disk configured to rupture at a predetermined pressure; and
a tire pressure sensor engageable with and disengageable from the tire inflation gas outlet opening of the over-inflation pressure relief valve, the tire pressure sensor in fluid communication with the over-inflation pressure relief valve and configured to sense a pressure of the tire inflation gas during inflation of the tire.

15. The aircraft wheel system of claim 14, wherein the tire pressure sensor includes a first engagement portion and the over-inflation pressure relief valve includes a second engagement portion, the first and second engagement portions having complementary threaded portions to mate with each other forming a tire pressure sensor assembly.

16. The aircraft wheel system of claim 14, wherein the stem comprises a threaded portion configured to mate with a complementary threaded portion of the sensor receptacle in the wheel.

17. The aircraft wheel system of claim 14, further comprising a sensor reading device and an interface, the sensor reading device configured to power and to interrogate the tire pressure sensor, receive a pressure datum from the tire pressure sensor, and transmit the pressure datum to the interface.

* * * * *